March 4, 1930.  C. G. OLSON  1,749,600
LOCK NUT
Filed July 11, 1928
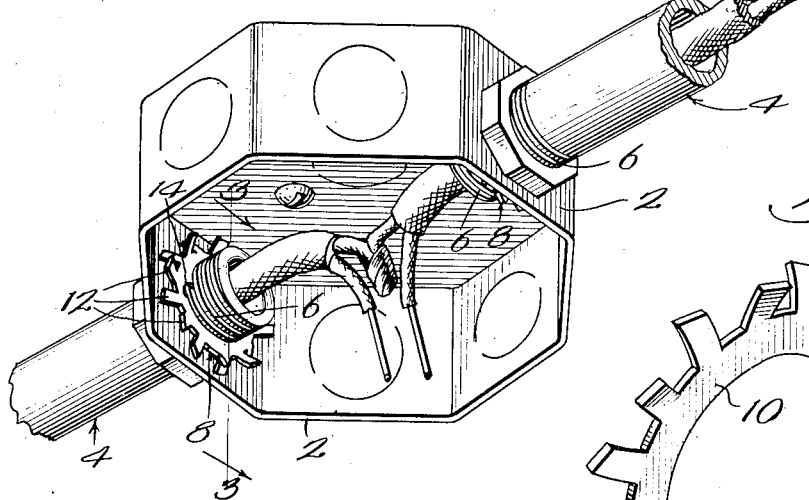
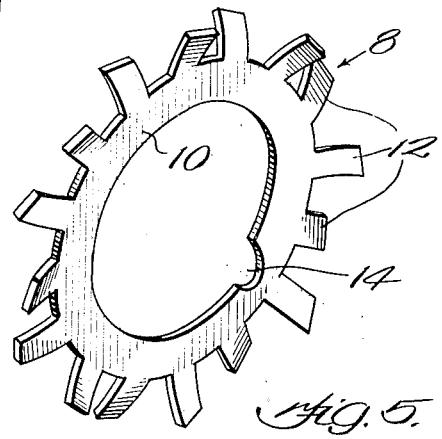
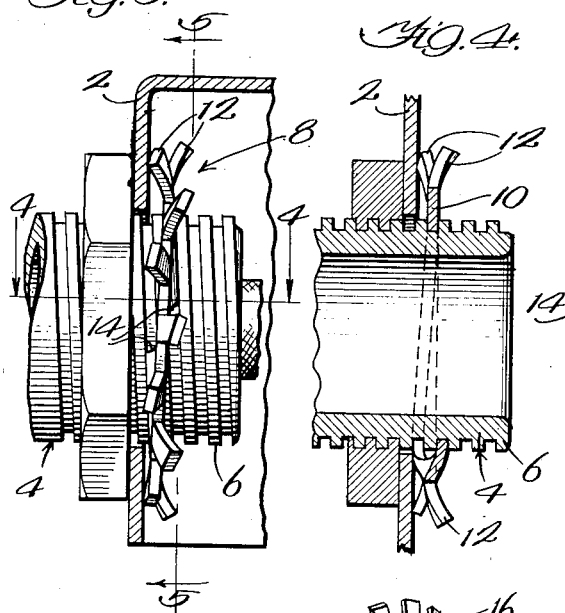
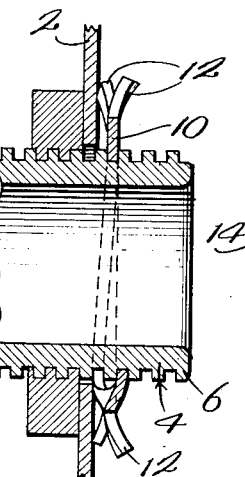
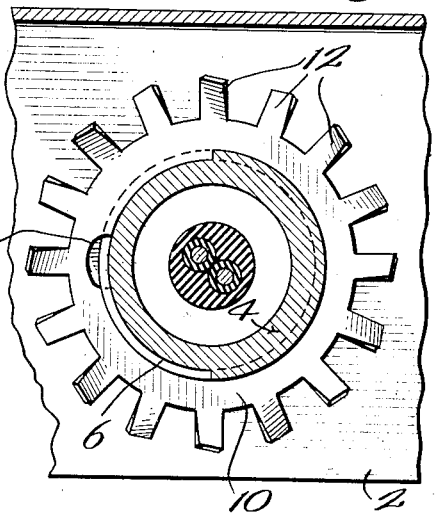
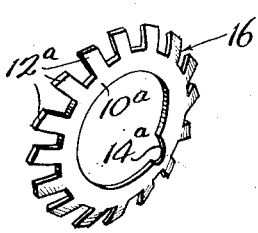
Inventor:
Carl G. Olson
By Cheever & Cox
Attys.

Patented Mar. 4, 1930

1,749,600

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

LOCK NUT

Application filed July 11, 1928. Serial No. 291,739.

My invention relates to lock nuts and particularly to annular lock nuts provided with marginal teeth for engaging the work.

An object of my invention is to provide a lock nut which may be formed from relatively thin, flat stock and which may be conveniently applied to the threaded portion of a member, such as a conduit, so as to effectively secure said member and parts associated therewith against displacement.

Another object of my invention resides in the provision of a lock nut which is very light in construction and yet which is capable of effectively securing parts in position upon a threaded member and which will not loosen, even though the parts are subjected to continued vibration.

Still further object of my invention is to provide an effectively operable lock nut which may be economically produced from flat stock, as for example by stamping, said lock nut being adapted to be secured upon the threaded portion of a member, the marginal portion of said nut being adapted for locking engagement with the work.

More specifically, it is an object of my invention to provide a lock nut of annular design having a plurality of oppositely disposed, twisted marginal teeth, said nut being adapted to be sprung into helical form to permit of its convenient application upon the threaded portion of a member, certain of the twisted marginal teeth serving to effectively interlock with the work and certain others thereof serving as means to facilitate the tightening of the nut.

A still further object of my invention is to provide an annular flat type lock nut having a plurality of marginal twisted teeth, said nut being of such a design that the user, in applying the same to the work, may select a nut from an indiscriminately arranged supply thereof and very conveniently apply the nut to the work without regard to the relative position of the lateral surfaces thereof.

These and other objects will be apparent from the following detailed description when considered in connection with the accompanying drawing wherein:

Figure 1 discloses a perspective view of an outlet box and associated conduits equipped with a lock nut embodying features of my invention;

Figure 2 is a detailed perspective view of the lock nut shown in Figure 1;

Figure 3 is a vertical sectional view taken along the line 3—3 of Figure 1, the conduit and lock nut being shown in elevation in order to more clearly illustrate the invention;

Figure 4 is a horizontal sectional view taken along the line 4—4 of Figure 3, the conduit and lock nut being shown in section as distinguished from Figure 3 in order to more clearly illustrate the manner in which the lock nut straddles the threads of the conduit;

Figure 5 is a fragmentary, vertical sectional view taken along the line 5—5 of Figure 3, and Figure 6 is a perspective view of a modified or alternative form of lock nut embodying features of my invention.

Referring now to the drawing wherein I have employed like numerals to designate similar parts throughout the various figures, it will be seen that for purposes of illustrating the practical application of my invention I have disclosed an outlet box 2 of conventional design and a pair of oppositely disposed conduits 4 projecting within the box 2, Figure 1. The inner extremities of these conduits 4 are provided with a threaded portion 6 upon which I have shown a lock nut which is constructed in accordance with the teachings of my invention and which I have designated generally by the numeral 8.

This lock nut 8 comprises an annular body portion 10 and a plurality of spaced marginal teeth 12. In order to permit the securing of the lock nut 8 upon the threaded portion 6 of the conduit, I provide a recess 14, Figure 2, within the body portion 10. By providing the recess 14, I enable the inner margin of the body 10 to straddle the threads of the conduit, as clearly shown in Figure 4, or in other words, permit the inner margin of the body to assume a helical form or convolution which will follow within the thread helices of the conduit. The marginal teeth or prongs 12 are twisted out of the plane of the body 10, as shown in Figure 3, in order to increase the locking effectiveness of the teeth with the work. In addition to being twisted, alternate teeth are deflected outwardly in one direction along the line of juncture with the body portion 10, while the other alternate teeth are deflected in the opposite lateral direction. By having these alternate teeth bent in opposite directions it will be seen that only half of the total number of the teeth are employed for lockingly engaging the work and in such instances the other teeth may be employed to facilitate the tightening of the nut upon the threaded conduit. Thus a suitable spanner wrench, or other convenient tool such as a screw driver (not shown) may be used for engaging these teeth to effectively tighten the nut in position.

In addition to providing means for gripping the nut in applying the same upon the conduit, the bending of alternate teeth in opposite directions enables either side of the nut to be applied to the conduit. Thus a worker in associating this type of a nut with a threaded member may select a nut from an indiscriminately arranged supply thereof and apply the same to the work without regard to which lateral surface of the nut is being carried into association with the work. In other words, my improved lock nut may be placed upon a thread and against a flat surface without selecting one side of the nut, by reason of the fact that both sides thereof are symmetrical.

In Figure 6 I have disclosed a modified or alternative form of lock nut indicated generally by the numeral 16. This nut includes a body portion 10$^a$ and a plurality of marginal locking teeth or prongs 12$^a$. The body portion 10$^a$ is provided with a recess 14$^a$ which serves for the same purpose as the recess 14 just described in connection with the lock nut 8. It will be noted that the lock nut 16 differs from the nut 8 in that the teeth 12$^a$ are all deflected in the same direction out of the plane of the body 10$^a$. This type of lock nut is particularly applicable in instances where additional holding power or locking effect is desired. All of the teeth 12$^a$ interlock with the work and hence this type of lock nut will have greater holding power than the type in which only half of the total number of teeth are employed to interlock with the work.

From the foregoing it will be understood that my invention contemplates the provision of a lock nut which is very inexpensive and very simple in construction. It has many advantages over types of lock nuts which have heretofore been employed as for example in connection with the securing of electric conduits and the like in outlet boxes. Heretofore considerable difficulty has been experienced in tightening nuts upon the threaded portion of the conduit by reason of the limited space surrounding the terminal of the conduit within the outlet box for receiving a tightening wrench and my improved device obviates these difficulties by reason of the deflection of alternate teeth which permit of the convenient application of a suitable tightening tool. Another problem which my improved lock nut has overcome is that of providing a locking device which will not loosen in response to vibrations to which conduits, outlet boxes and devices of similar nature are subjected. When the lock nut is applied to the thread member, the body thereof is sprung into helical shape and as the marginal teeth are moved into locking engagement with the wall of the outlet box, the inherent resiliency of the sprung lock nut material will cooperate with the actual locking effect of the teeth to positively prevent the loosening of the nut in response to any vibration to which the parts may be subjected. Although I have disclosed a particular type of apparatus for which my improved device is particularly applicable, it will be understood that lock nuts of my improved design may be used for numerous other purposes where an effective locking device is required which is of simple and economical construction and which may be secured or screwed in position in places which are difficult to reach with the usual types of tightening tools. Thus my invention provides a lock nut of very practical design which may be manufactured at a minimum cost and which may be quickly and conveniently applied to the work.

Having thus described my invention, what I claim as new and desire to secure by Letters Patent is:

1. A lock nut comprising an annular body portion of flat stock, and a plurality of marginal twisted teeth for lockingly engaging the work, said body portion being adapted for application upon the threaded portion of an element to be secured.

2. A lock nut comprising an annular body portion, and a plurality of marginal teeth, certain of the teeth being deflected out of the plane of the body portion in one direction and certain other of the teeth being deflected out of the plane of the body portion in the opposite direction, said body portion being adapted to be tightened upon the threaded portion of an element to be secured.

3. A lock nut comprising an annular body portion of flat stock and a plurality of marginal teeth, certain of the teeth being deflected in one direction out of the plane of the body portion and certain other of the teeth being deflected in the opposite direction out of the plane of the body portion, thereby presenting a plurality of teeth for lockingly engaging with the work, and a plurality of teeth which may be employed for tightening the nut upon a threaded member.

4. An annular lock nut comprised of flat stock having a plurality of external, twisted teeth for lockingly engaging the work, the annular continuity of the nut being broken to permit the same to assume a helical form in conformity with the helix of the thread upon which it is applied.

5. An annular lock nut comprised of flat stock having a plurality of marginal teeth for lockingly engaging the work, said nut being adapted to be applied to a screw thread, certain of the marginal teeth being deflected in one direction laterally of the body of the lock nut and certain others deflected in the opposite direction, both sides of the nut being symmetrical so as to permit either of said sides to be applied to a threaded member.

6. In an annular lock nut for application to a threaded member, twisted locking teeth provided upon the periphery thereof deflected side-wise and twisted in a direction to allow the nut to be readily screwed and tightened upon the threaded member, the sharp corners of the teeth resulting from the twisting thereof being adapted to dig into the work in response to any tendency of the nut to unscrew, thereby effectively securing the same against loosening.

7. In combination with a threaded member having an abutment associated therewith and an apertured element against which the abutment may be clamped, a lock nut comprising an annular body portion of flat stock, said body portion being recessed to permit the same to assume a helical form for application to said threaded member, and having a plurality of outer marginal teeth twisted out of the plane of said body portion, said teeth being adapted to lockingly engage the apertured element so as to clamp said element between the abutment and said lock nut to thereby secure said element in a fixed position with respect to the threaded member.

8. In combination with an apertured element and a threaded member extending through said aperture which is provided with an abutment for engaging one side of said element, a lock nut comprising an annular body portion of flat stock, said stock being configurated to enable the same to be screwed upon the threaded member regardless of the side of the nut which is advanced upon said member, said means being provided with a plurality of external marginal teeth twisted out of the plane of the body portion and adapted to lockingly engage the side of the apertured member oppositely disposed from the side engaged by said abutment.

In witness whereof, I have hereunto subscribed my name.

CARL G. OLSON.